United States Patent [19]
Shepard

[11] 3,767,441
[45] Oct. 23, 1973

[54] HOLD-DOWN COMPOSITION FOR MACHINING ARTICLES

[75] Inventor: Robert W. Shepard, San Diego, Calif.

[73] Assignee: Rohr Industries, Inc., Chula Vista, Calif.

[22] Filed: Jan. 25, 1971

[21] Appl. No.: 109,694

Related U.S. Application Data

[62] Division of Ser. No. 741,287, July 1, 1968, Pat. No. 3,586,559.

[52] U.S. Cl.............. 106/272, 106/287 R, 156/155, 156/320
[51] Int. Cl. ........................ C08h 9/06, C08h 17/24
[58] Field of Search................ 106/272, 271, 287 R, 106/307; 156/155, 320; 161/234, 235; 264/275; 208/21

[56] References Cited
UNITED STATES PATENTS

| | | | |
|---|---|---|---|
| 141,829 | 5/1873 | Strong................................ | 106/272 |
| 160,741 | 1/1875 | Alvord................................ | 106/272 |
| 50,000 | 9/1865 | Havard.............................. | 106/272 |
| 2,462,018 | 2/1949 | Wood................................ | 106/272 |

OTHER PUBLICATIONS

Kirk–Othmer, "Encyclopedia of Chemical Technology," 2nd Edition, Volume 1, page 165, 1964.

Bennett, "Commercial Waxes," Second Edition, 1956, Chemical Publishing Co., Inc., N.Y.C., pages 483, 491, 492 & 497.

Skeist, "Handbook of Adhesives," Van Nostrand Reinhold Company, N.Y.C., 1962, pages 448 and 449.

*Primary Examiner*—Allan Lieberman
*Attorney*—George E. Pearson

[57] ABSTRACT

A composition for adhering a workpiece to a workholder while a machining operation is performed is disclosed. The composition comprises 10–25 percent by weight of activated charcoal, 1–10 percent by weight of a plasticizer and the balance of a hold-down type wax such as o-terphenyl or paraffin. A method of mixing the ingredients of the composition, applying the mixture to the workpiece and removing same when the work function is completed is also disclosed.

2 Claims, No Drawings

3,767,441

HOLD-DOWN COMPOSITION FOR MACHINING ARTICLES

CROSS-REFERENCE

This application is a division of my copending application for "Hold-Down Composition for Machining Aritcles," Ser. No. 741,287, filed July 1, 1968, now U.S. Pat. No. 3,586,559.

BACKGROUND OF THE INVENTION

This invention relates generally to adhesive hold-down compositions for adhering a workpiece to a workholder and more particularly to a composition of matter for holding metal honeycomb to a workpiece holder in a secure yet readily removable manner while some work function is applied to it.

In the manufacture of parts from metal honeycomb blocks, the workpiece must be temporarily but securily bonded to a workpiece holder while some work function such as cutting, shaping, etc., is applied to it. By its nature, honeycomb cannot readily be clamped, gripped or secured in any of the conventional manners to the holder. The problem of bonding the honeycomb to the workholder in a temporary manner has bothered the industry for a number of years with numerous techniques having been suggested and utilized for the noted function. In general, some form of an adhesive has been relied on in the past to perform the hold-down function. Various materials such as wax, soap, ice, a type of sugar candy, waterglass and many others have been suggested and used. All of these materials are similar in that they respond to a rise in temperature to free the workpiece after the work function has been performed or the application of water to the bonding material breaks the bond thereby freeing the workpiece. All of the suggested known materials exhibit numerous disadvantages such as poor adhesion, low adhesive strength, difficult handling characteristics, inability to be applied to non-horizontal surfaces, difficulty of removal, etc.

It is therefore desired to remedy the disadvantages of the prior art materials while retaining all of their known desirable characteristics. In particular it is desired to obtain a method and apparatus for fastening a honeycomb workpiece or other structure to a workholder in a simple yet effective manner with a minimum of difficulty and without causing any deleterious effects to the materials used.

SUMMARY OF THE INVENTION

An object of this invention therefore is to provide an adhesive for temporarily bonding a workpiece to a workholder while a machining operation is performed thereon.

Another object of this invention is to provide a hold-down composition and method for holding a honeycomb workpiece to a workholder.

Yet another object of this invention is to provide an improved hold-down composition which is readily removable when so desired.

A more particular object of this invention is to provide a composition and a method for adhering a section of honeycomb foil to a workholder in a removable manner while the foil is machined.

A still more particular object of this invention is to provide a composition and method for adhering contoured honeycomb foil sections to a workholder.

The instant invention achieves the above noted objects by adding to a wax-type hold-down composition a quantity of finely divided activated charcoal in a proportion within the range of 10 – 25 percent by weight. A suitable long chain plasticizer can also be added to improve the working characteristics of the new composition. The composition of this invention is applied in a method comprising heating the composition to above its melting point, applying it to a workholder, bringing the workpiece in contact with the workholder, and cooling the composition to below its melting point causing it to assume its solid form and adhere the workpiece to the workholder. The workpiece may then be later removed by reheating the composition to above its melting point. Any residual composition remaining on the workpiece or workholder can be readily removed by vapor degreasing and hot alkaline cleaning.

The above noted objects and features of this invention will be better understood from the following detailed description and appended claims.

DETAILED DESCRIPTION

As indicated, the purpose of the present invention is to thicken a hold-down type wax without lessening any of its ability to provide adequate adhesion or tensile strength to adhere a workpiece to a holder and, further, to avoid any change in the material which might make it difficult to remove after an adequate bond was effected by it. Furthermore the additive material must not be of a nature whereby the material of the workpiece may be damaged by corrosion or other deleterious reactions. The desired effect and result is accomplished by adding finely divided activated charcoal to a hold-down type wax. A plasticizer may also be added to provide a wetting agent function, aid in the mixing of the charcoal with the wax, and lower the solidification temperature to provide a longer application, or working, time. The addition of the plasticizer also results in a final composition having a finer and more homogenous texture.

In searching for an adhesive which would meet the exacting requirements of this method, a number of compounds were tested. A wide range of water insoluble waxlike materials, long chain plasticizers and powders have been found which are suitable, however, the preferred composition is a water insoluble waxlike material such as o-terphenyl or paraffin, strengthened by the addition of a powder such as finely divided activated charcoal, and, in the case of o-terphenyl, plasticized with a long chain material such as paraffins or ethylene oxide condensates of phenols. The charcoal powder serves the additional function of thickening the wax material to simplify application to a non-horizontal surface. It is advisable to vary the proportion of plasticizer to suit the conditions such as the adhesive strength needed or the amount of working time required in application.

In determining the proportions for the various ingredients to be added to the wax, it was found that best results were achieved when a quantity of finely divided activated charcoal within the range of 10 – 25 percent by weight is utilized. Adding charcoal powder in excess of 25 percent tended to make the resultant composition too dry and crumbly. On the other extreme insufficient activated charcoal, i.e., less than 10 percent by weight, does not result in the composition having the desired characteristics. In particular, with charcoal amounts below 10 percent by weight the desired thickening is insufficient and handling characteristics are therefor undesirable.

Considering the plasticizer, it was determined that a range of from 1 – 10 percent by weight produced the best results. The addition of plasticizer in amounts less than 1 percent fails to achieve the desired benefits for which the addition of the plasticizer is intended. Furthermore, the addition of plasticizer in amounts greater than 10 percent by weight results in the creation of a composition which tends to be too plastic and never hardens sufficiently to achieve the desired adhesive effect. In view of the limited solubility of the plasticizer in the solid wax, the addition of too much of same results in the excess being driven out of solution to the interface between the adhesive composition and the adjacent workpiece or workholder. The effect of the latter is to prevent a secure surface bond between the noted parts.

It the hold-down wax used is paraffin, it has been found that the plasticizer is not necessary and consequently may be omitted from the composition.

The following examples illustrate three embodiments of a hold-down composition made in accordance with this invention. The percentages given represent percent by weight in the total composition.

EXAMPLE 1

| | |
|---|---|
| Activated Charcoal powder | 10–25% |
| Plasticizer | 1–10% |
| O-terphenyl wax | Balance |

EXAMPLE 2

| | |
|---|---|
| Activated Charcoal powder | 10–25% |
| O-terphenyl wax | Balance |

EXAMPLE 3

| | |
|---|---|
| Activated Charcoal powder | 10–25% |
| Paraffin wax | Balance |

In the composition of Examples 1 and 2 the o-terphenyl used was that sold under the tradename of Santo Wax-O and manufactured by the Monsanto Company. The plasticizer of Example 1 was that sold under the tradename Triton X-100 by Rohm and Haas. Nuchar C-190N activated charcoal powder as supplied by the Matheson Chemical Company, Inc. was used in each example.

The composition of Example 1 is prepared by the method which follows. The o-terphenyl is first heated and raised to above its melting temperature, preferably to a temperature within the range of 200° – 240°F. The plasticizer is then mixed in with the o-terphenyl. Activated charcoal powder is then added with vigorous mixing until the desired consistency is reached. The charcoal should be added in a manner to minimize dust blowing yet assure complete mixing. It may be observed that lumps sometimes form during the mixing process, however these are readily broken up. Mixing should continue until all of the charcoal powder is evenly dispersed throughout the mixture. The composition so prepared may be used immediately or poured into a mold to be cooled and stored as a cake and reserved for later use. It is only necessary to re-heat and stir the already prepared but cooled composition when it is to be applied.

The composition of Example 2 and 3 is prepared in essentially the same manner as that of Example 1 with the elimination of the step requiring the addition of the plasticizer. In other words, the o-terphenyl or paraffin is heated to approximately 200° – 240°F and the charcoal powder in the desired proportion is thoroughly mixed therewith.

Each of the exemplary compositions is intended for a specific use. Example 1 is preferred for general usage with contoured workpieces/workholders. It is essentially a compromise between ultimate strength and workability. The plasticizer tends to decrease the ultimate strength while increasing the workability by lowering the hardening temperature and hence lengthening the hardening time.

The Example 2 composition is best suited for those applications where the highest adhesive strength is desired and workability is of no great consequence. Typically, it has its greatest utility in the bonding of flat surfaces where the composition can be quickly applied.

Example 3 has the least strength of the group but tends to be more flexible, or plastic, even when hardened. This latter characteristic makes it desirable where the workpiece must yield somewhat during a machining process.

All of the embodiments of the instant invention are used in a manner or method to be described. After choosing a composition with the proper proportions to suit the character of the workpiece and workholder, the chosen composition is prepared for use by heating to a temperature within the range of 200° – 240°F and stirring thoroughly. It is then applied to the workholder by some suitable means. The exact means of application may be varied to suit the particular situation. It has been noted that the adhesive composition of this invention may be spread with a trowel or allowed to flow down an inclined tool face for example. In the last method the adhesive composition forms a stable uniform coating with a thickness depending upon the viscosity of the particular composition.

Better adhesion can be obtained, and application simplified, if the workholder is warmed to 100° – 150°F before the composition is applied. Through control of tool and adhesive temperatures, considerable application time can be arranged. Long application times may be desired, as previously noted, to facilitate application of the composition to contoured surfaces or the like.

After the adhesive composition has been applied to the surface of the workholder, the workpiece is positioned over the workholder and force is applied to conform the workpiece to the workholder. After such a step, the edges of the workpiece that are adjacent to the workholder will be submerged in the adhesive composition. When the temperature of all the parts and the composition is then allowed to lower to a point below which the composition resumes its solid state, the workpiece will be rigidly attached to the workholder. The desired machining operations can then be performed.

When it is desired to remove the workpiece, it is merely necessary to elevate the temperature of the composition to above its melting point. It has been found that for this purpose an array of heat producing electrical lamps provides sufficient melting. The workpiece can then be readily removed. A residual quantity of the composition may remain on the workpiece after it is removed from the workholder, however, same may readily be removed by vapor degreasing and/or hot alkaline cleaning techniques. Any residue on the workholder of course can be removed in the same manner.

It may be further noted that as in any other adhesive process, both the workpiece and the workholder should be cleaned to remove any possible contaminants before the composition is applied. In the case of metal honeycomb foil, for example, cleaning in a trichloroethylene degreaser followed by complete drying adequately prepares the structure for the bonding.

In accordance with this invention then, it should be apparent that a simple but yet effective composition, a method of making same, and a method for adhering a workpiece to a workholder have been disclosed. Although the invention has been described with respect to three particular embodiments thereof, it should not be limited thereto for various changes and modifications could be made by one having ordinary skill in the art without departing from the spirit and scope of this invention as defined in the following claims:

I claim:

1. A strengthened adhesive compound for temporarily adhering a workpiece to a workholder consisting of:

a wax type material said material being o-terphenyl, and finely divided activated charcoal, uniformly dispersed therein wherein the weight of the charcoal is 10 – 25 percent of the weight of the composition.

2. The composition of claim 1 further including 1–10 percent by weight of a long chain plasticizer selected from the group consisting of paraffin and ethylene oxide condensates of phenols.

* * * * *